Patented Dec. 16, 1947

2,432,713

UNITED STATES PATENT OFFICE

2,432,713

COMPOSITION CONTAINING HIGHER CONDENSATION PRODUCTS OF ALDEHYDES AND AROMATIC AMINES

John D. Bartleson, Cleveland, Ohio, assignor to The Standard Oil Company, Cleveland, Ohio, a corporation of Ohio No Drawing. Application December 11, 1944, Serial No. 567,792

1 Claim. (Cl. 252—51.5)

This invention relates to organic compositions which are stabilized against oxidation and other forms of deterioration. More particularly, it relates to hydrocarbons, such as natural and synthetic rubbers, petroleum products, for example, lubricants, such as lubricating oil and grease bases, etc., which have been stabilized against deterioration under conditions of usage.

Lubricating oils, particularly when used under higher temperature conditions such as in an internal combustion engine, are subject to breakdown, oxidation, sludge formation, and the like, and tend to cause corrosion of the bearing and other metals with which they are in contact.

In order to minimize or preferably to avoid entirely serious deterioration in internal combustion engines, it is highly desirable to use lubricants which show a minimum of or are entirely free of such objectionable effects.

It is an object of the present invention to provide an agent which when added to hydrocarbons, including lubricants, will markedly inhibit the tendency thereof toward oxidative breakdown.

Another object of the invention is to provide an agent which when added to lubricating oils will markedly inhibit the corrosive effect thereof on bearing or other metal parts with which the oil comes in contact.

It is a further object of this invention to provide stabilized compositions containing such an addition agent.

Another object of the invention is to provide novel compositions which are superior in their functions to other compositions now available and intended for the same general purposes.

Other objects of this invention will become apparent as it is more fully disclosed hereinafter.

It has been proposed heretofore to react formaldehyde with primary aromatic and with mono- or dialkyl aromatic amines to form diphenylmethane derivatives, known in the trade as "methane bases." It has also been proposed heretofore to use the primary reaction products thereof as oxidation inhibitors. However, it has generally been considered that the secondary or higher reaction products obtained by similar processes would be detrimental when added to hydrocarbons or lubricants. Any such higher or secondary reaction products have, therefore, been separated and discarded.

It has now been found that the secondary or higher reaction products of the reaction of lower aldehydes such as formaldehyde, acetaldehyde or propionaldehyde with aromatic amines are excellent oxidation and corrosion inhibitors for hydrocarbons and in particular for lubricating oil and grease base stocks. Formaldehyde is economic and readily available so it will be used in the following disclosure; however, other lower aldehydes of not over 3 carbon atoms may be used similarly.

The secondary or higher reaction products are readily prepared by reacting the aromatic amine with the aldehyde in aqueous solution. An acid catalyst is helpful and the reaction proceeds better at an elevated temperature. The catalyst may be, for example, 6-normal hydrochloric acid. In the case of formaldehyde, 2 mols of the amine to one of the aldehyde is a preferred mol ratio.

The temperatures may be, for example, about 100° to 400° F., preferably about 200° to 212° F. The reaction rate depends on the temperature and somewhat on the amines used; it is usually completed in about 5 to 30 hours time. The resulting aqueous solution is made alkaline, steam distilled to remove any unreacted amine, and the residual water insoluble organic material separated and distilled under vacuum. Alternatively, the latter may be fractionated by recrystallization.

The primary reaction product, a diaminodiaryl-methane, comes off first in the vacuum distillation. The residue from this distillation is the secondary or higher reaction product, which is the inhibitor of the invention. It can be used in this form or can be distilled at higher temperatures and higher vacuum.

For many purposes, it is not necessary to separate the primary reaction product from the secondary or higher reaction products. For example, the reaction mixture separated from the aqueous solution may be used as such. This results in an appreciable reduction in cost since the expense of vacuum distillation step is avoided.

The yields of the higher or secondary reaction products vary from about 5% to about 60%, depending upon the amine used, the reaction time and the temperature employed.

The aromatic amines used in forming these products may be primary aromatic amines such as aniline, a toluidine or a xylidine or lower N-alkyl substituted mono-cyclic aromatic amines; lower alkyl-mono-cyclic aryl N-lower-alkyl-amines, or mixtures thereof may likewise be used. By lower alkyl is meant an alkyl group containing not over 5 carbon atoms. It is necessary that the aromatic amine be unsubstituted in the ring at either the ortho or the para position to the amino group, and have at least one hydrogen directly attached to the nitrogen since if these positions are substituted or blocked the desired reactions will not occur. These amines may be represented by the formula

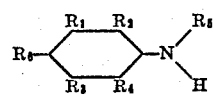

Wherein $R_1$, $R_2$, $R_3$, $R_4$, $R_5$ and $R_6$ are each hydrogen or a lower alkyl radical, and at least one of the even numbered R's is hydrogen; i. e. at least one of $R_2$, $R_4$ or $R_6$ is hydrogen.

In order to point out the invention more clearly and to illustrate some of its advantages, but in no wise to limit the scope of the invention as otherwise described and claimed herein, the following examples, illustrations and tests of lubricants comprising some of the compositions in accordance with the invention are given.

Example 1

2 mols of N-ethylaniline were mixed with 1 mol of formaldehyde (as 40% aqueous solution) and 4 mols of hydrochloric acid. This mixture was heated at 200 to 212° F. for 24 hours. The resulting aqueous solution was made alkaline with aqueous sodium hydroxide and steam distilled; about $\frac{1}{10}$ mol of unreacted N-ethylaniline was recovered thereby. The residual water insoluble organic material was separated, and then distilled under vacuum, about half of it distilled at 261° to 262° C. at 9 mm. Hg. This distillate was the primary reaction product N,N'-diethyl-p,p'-diamino-diphenylmethane. The residue, i. e., the product used in accordance with the invention was a clear, viscous, amber liquid which was not pourable at room temperature.

Example 2

2 mols of N-methylaniline were mixed with about 1 mol of formaldehyde (as 40% aqueous solution) and 4 mols of hydrochloric acid. This mixture was heated at 200° to 212° F. for 24 hours. The resulting aqueous solution was made alkaline and steam distilled; about 0.10 mol of unreacted N-methylaniline was recovered thereby. The residual water insoluble organic material was separated. It was a mixture of the primary reaction product N,N'-dimethyl-p,p'-diamino-diphenyl methane and the polymeric product, i. e., a mixture containing the product of, and usable in accordance with, the invention. It was a clear, viscous, amber liquid which was difficultly pourable at room temperature.

As further illustrations, corresponding products from a toluidine, a xylidine, or other amine as disclosed above may be prepared by similar procedures.

In order to demonstrate the properties of lubricating oil compositions containing the higher formaldehyde aromatic amine reaction products in accordance with the invention, a number of representative compositions were made from conventional lubricating oils and products obtained as in the foregoing examples.

The lubricating oils containing these additives were tested according to laboratory test procedures for evaluating the service stability of oils as described in a paper by R. E. Burk, E. C. Hughes, W. E. Scovill and J. D. Bartleson presented at the Atlantic City meeting of the American Chemical Society in September, 1941, and in another paper by the same authors presented at the New York city meeting of the American Chemical Society in September, 1944. The latter paper also correlates the results of such laboratory tests with the so-called "Chevrolet engine test."

Essentially the laboratory test equipment consists of a vertical, thermostatically heated, large glass test tube, into which is placed a piece of steel tubing of about one third its length and of much smaller diameter. A piece of copper-lead bearing strip is suspended within and from the upper end of the steel tube by a copper pin, and an air inlet is provided for admitting air into the lower end of the steel tube in such a way that in rising the air will cause the oil present to circulate. The test tube is filled with an amount of the oil to be tested which is at least sufficient to submerge the metals.

The ratios of surface active metals to the volume of oil in an internal combustion test engine are nearly quantitatively duplicated in the test equipment. In the "standard" test the temperature used is approximately the average temperature of the crankcase, and the "temperature tolerance" test temperature is approximately that of the piston ring zone of a test engine in operation. The rate of air flow per volume of oil is adjusted to the same as the average for a test engine in operation. Catalytic effects due to iron are empirically duplicated by the addition of a soluble iron salt, and those due to lead-bromide by its addition. The duration of the test is adjusted to that usually used in engine type tests. As is shown by the data in the papers referred to, the laboratory tests have been correlated with engine tests and the properties of the oil in an engine may be determined from the result of the laboratory tests.

The results given herein were obtained from tests using:

A 160 cubic centimeter sample of the lubricant composition
70 liters of air per hour
100 square centimeters of steel surface
4.4 square centimeters of copper-lead surface
1.0 square centimeters of copper surface
0.10% by weight of lead bromide powder
0.012% soluble iron calculated as $Fe_2O_3$ (ferric 2-ethyl hexoate in C. P. benzene)

The "standard" tests were run at 280° F. for 36 hours; the "temperature tolerance" (heavy duty) tests were run at 350° F. for 10 hours. The lacquer is deposited on the steel tube and is determined by difference in weight of the tube after washing with chloroform and drying to constant weight. The corrosion was determined by difference in weight of the copper-lead bearing strip after scrubbing with chloroform. The used oil was sufficient to enable the determination of all of the usual oil tests, such as naphtha insolubles and chloroform solubles, viscosity, acid number, etc.

To illustrate the value of the products of the invention as additives for oils normally forming appreciable lacquer deposit and also having corrosion characteristics, compositions were made from a conventional acid treated Mid-Continent lubricating oil base stock blended with Pennsylvania bright stock (S. A. E. 20) and tested. The "standard" test results given in Table I are representative for compositions containing the higher boiling product of Example 1, using 0.25% by weight, and 0.50% by weight of the additive.

Table I

| | Blank | 0.25% | 0.50% |
|---|---|---|---|
| Lacquer (in milligrams) | 11.4 | 4.9 | 1.6 |
| Naphtha Insolubles (in milligrams) | 193.3 | 58.0 | 76.5 |
| Chloroform Solubles (in milligrams) | 187.5 | 39.6 | 27.5 |
| Corrosion Weight Loss Cu-Pb bearing metal (in milligrams) | 7.4 | 4.4 | 3.8 |
| Acid number | 2.8 | 1.6 | 1.04 |
| Viscosity Increase (S. U. S.) | 642 | 162 | 45 |

To illustrate the comparative value of the higher boiling products of the invention relative to the corresponding primary condensation product, compositions similar to the foregoing were made up using 0.25% by weight of the additive and tested. The "temperature tolerance" test results given in Table II are representative for compositions containing an oil of the type used for the data of Table I, and the products of Example 1.

*Table II*

|  | Blank | Primary | Higher Boiling |
|---|---|---|---|
| Lacquer (in milligrams) | 4.8 | 8.5 | 4.5 |
| Naphtha Insolubles (in milligrams) | 235.1 | 277.1 | 174.7 |
| Chloroform Solubles (in milligrams) | 229.3 | 194.7 | 87.7 |
| Corrosion Weight Loss Cu-Pb bearing metal (in milligrams) | 25.2 | 10.9 | 0.7 |
| Acid number | 2.2 | 1.6 | 1.2 |
| Viscosity Increase (S. U. S.) | 1479 | 453 | 214 |

To illustrate the value of the products of the invention as additives for oils normally giving rise to no appreciable lacquer or sludge formation but having appreciable corrosion and viscosity increase characteristics, compositions were made up from acid treated Pennsylvania lubricating oil base stocks, and also from solvent extracted Mid-Continent lubricating oil base stocks using 0.25% by weight of the higher boiling product of Example 1. The results given in Table III(a) are representative for an S. A. E. 30 Pennsylvania base, and those given in Table III(b) are representative for an S. A. E. 30 solvent extracted Mid-Continent base.

*Table III (a)*

|  | Blank | With Additive |
|---|---|---|
| Corrosion Weight Loss Cu-Pb bearing metal (in milligrams) | 10.4 | 2.7 |
| Acid number | 2.5 | 1.0 |
| Viscosity Increase (S. U. S.) | 391 | 114 |

*Table III (b)*

|  | Blank | With Additive |
|---|---|---|
| Corrosion Weight Loss Cu-Pb bearing metal (in milligrams) | 10.7 | 2.4 |
| Acid Number | 4.6 | 2.5 |
| Viscosity Increase (S. U. S.) | 761 | 221 |

These tests show the marked improvement imparted to the lubricating oils by the higher boiling condensation products in accordance with the invention and the superiority of these higher products over the primary products as additives. They also show that mixtures of the primary and higher reaction products may be used to advantage.

It will be obvious to one skilled in the art that products obtained by different procedures but having substantially the same chemical and physical properties as those herein described may be used in accordance with the invention. The invention as claimed contemplates all such compositions within the scope of the appended claim.

The term "lubricant" appearing in the appended claims is intended to mean the ordinarily used base stock lubricating oils, greases, and the like.

I claim:

A lubricating composition adapted for use in lubricating internal combustion engines containing copper-lead bearings, which composition comprises a major proportion of the lubricating oil normally deteriorative under conditions of service so as to be corrosive with copper-lead bearings, and a minor amount of an additive sufficient to stabilize said oil and markedly inhibit the corrosive properties of said oil, said additive being the condensation product of the reaction of about 1 mol of formaldehyde with about 2 mols of N-ethyl aniline reacted in an aqueous acidic solution at an elevated temperature, and boiling above and separated from any condensation product boiling lower than 262° C. at 9 mm. Hg absolute pressure.

JOHN D. BARTLESON.

REFERENCES CITED

The following references are of record in the file of this patent:

UNITED STATES PATENTS

| Number | Name | Date |
|---|---|---|
| 1,556,415 | Caldwell | Oct. 6, 1925 |
| 1,594,983 | Sommerville | Aug. 3, 1926 |
| 1,939,192 | Williams | Dec. 12, 1933 |
| 2,113,599 | Musselman | Apr. 12, 1938 |
| 1,890,917 | Semon | Dec. 13, 1932 |
| 2,223,411 | Fuller | Dec. 3, 1940 |
| 2,395,093 | Bishop | Feb. 19, 1946 |